US 8,558,495 B2

(12) United States Patent
Hong et al.

(10) Patent No.: US 8,558,495 B2
(45) Date of Patent: Oct. 15, 2013

(54) SENSORLESS BLDC MOTOR CONTROL BY COMPARING INSTANTANEOUS AND AVERAGE BEMF VOLTAGES

(75) Inventors: Bokyoung Hong, Palo Alto, CA (US); Nilesh Rajbharti, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 262 days.

(21) Appl. No.: 13/195,372

(22) Filed: Aug. 1, 2011

(65) Prior Publication Data
US 2013/0033212 A1 Feb. 7, 2013

(51) Int. Cl.
*H02P 6/00* (2006.01)
*H02P 6/16* (2006.01)

(52) U.S. Cl.
USPC ............. 318/400.35; 318/400.34; 318/430; 318/432

(58) Field of Classification Search
USPC .............. 318/430, 432, 400.34, 400.35; 360/73.03, 75
See application file for complete search history.

(56) References Cited

U.S. PATENT DOCUMENTS

| 5,471,353 | A  | * | 11/1995 | Codilian et al. | 360/73.03 |
| 5,650,886 | A  | * | 7/1997  | Codilian et al. | 360/73.03 |
| 6,078,158 | A  | * | 6/2000  | Heeren et al.   | 318/430 |
| 8,212,508 | B2 | * | 7/2012  | Paintz et al.   | 318/400.34 |
| 8,294,400 | B2 | * | 10/2012 | Harmer          | 318/400.34 |
| 2009/0096397 | A1 | * | 4/2009 | Paintz et al. | 318/400.35 |
| 2010/0182715 | A1 | * | 7/2010 | Harmer        | 360/75 |
| 2010/0244887 | A1 | * | 9/2010 | De Cock       | 324/772 |

OTHER PUBLICATIONS

Chinese Office Action issued in 201120513350.X, issued May 24, 2012, 5 pages.

* cited by examiner

*Primary Examiner* — Paul Ip
(74) *Attorney, Agent, or Firm* — Fish & Richardson P.C.

(57) ABSTRACT

Sensorless driving of a brushless DC (BLDC) motor includes detecting a zero crossing time from back electromotive force (BEMF) voltage of the BLDC motor. An instantaneous BEMF voltage and an average BEMF voltage are compared to detect the crossover time, which can be used to change the commutation switching sequence. Since the average BEMF voltage differs for odd and even steps of the commutation switching sequence, average BEMF voltages are calculated separately for odd and even sequences and compared to instantaneous BEMF voltages to detect crossover points for the odd and even sequences. The times to commutations for the odd and even sequences are averaged to provide an average time to the next commutation cycle. The average time can be scaled by a reduction factor to reduce the effects of measurement noise.

20 Claims, 4 Drawing Sheets

SENSORLESS BLDC MOTOR CONTROL BY COMPARING INSTANTANEOUS AND AVERAGE BEMF VOLTAGES

TECHNICAL FIELD

This disclosure relates generally to electronics, and more particularly to sensorless driving of Brushless DC (BLDC) motors.

BACKGROUND

BLDC (Brushless DC) motors are replacing DC motors and induction motors due to its efficiency and reliability. Unlike DC motors, BLDC motors need commutation based on rotor position. Hall effect sensors have been used to detect rotor position. However, mounting Hall effect sensors and processing signals from those sensors require additional cost. Moreover, a Hall effect sensor and its wiring can reduce the reliability of a motor drive system. Due to these additional costs and reliability concerns there has been interest in developing BLDC motors without position sensors.

A common way of estimating rotor position without position sensors is by measuring back electromotive force (BEMF) voltage. BEMF voltage of a motor varies according to rotor position. Measuring BEMF voltage also requires the use of a trapezoidal pulse width modulation (PWM) drive to run the motor. With a trapezoidal drive, BEMF voltage can be measured on the floating phase terminal during a no-switching period. Based on this measurement, a zero crossing point of the BEMF voltage can be detected. The zero voltage point can be used to predict a time required for a next commutation cycle.

The terminal voltage measured during the no-switching period is not the motor phase voltage. The neutral point voltage should be taken into consideration to detect correctly the zero crossing point of the BEFM voltage. Typically, the neutral point of a motor's three-phase winding is not exposed in most applications. Conventionally, three resistors have been used to simulate the neutral point. In addition to these resistors, resistor-capacitor (RC) filters are used to filter out PWM noise components from the sensed BEMF voltage. This filtering can result in sensing delay, which has a negative influence on high-speed motor performance. In addition, the additional filter components can affect cost, reliability and consume valuable printed circuit board (PCB) area.

Some conventional methods propose using simpler hardware by measuring phase voltage when the neutral voltage goes to low. These methods, however, need some amount of turn-off period, which prevents operation of the motor at high speed. Other conventional methods propose measuring phase current information. These methods, however, require additional hardware and CPU resources and are not suitable for applications where cost is a critical factor for product success.

SUMMARY

Sensorless driving of a brushless DC (BLDC) motor includes detecting a crossover time from back electromotive force (BEMF) voltage of the BLDC motor. An instantaneous BEMF voltage and an average BEMF voltage are compared to detect the crossover time, which can be used to change the commutation switching sequence. Since the average BEMF voltage differs for odd and even steps of the commutation switching sequence, average BEMF voltages are calculated separately for odd and even sequences and compared to instantaneous BEMF voltages to detect crossover points for the odd and even sequences. The times to commutations for the odd and even sequences are averaged to provide an average time to the next commutation cycle. The average time can be scaled by a reduction factor to reduce the effects of measurement noise.

In some implementations, a method of detecting BEMF for controlling a brushless DC motor comprises: measuring BEMF voltages during a start period of a BLDC motor; determining an average BEMF voltage value from the measured BEMF voltages; determining an instantaneous BEMF voltage; and comparing the average BEMF voltage with the instantaneous BEMF voltage to detect a crossover time of the BEMF voltage.

In some implementations, a system comprises interface circuitry configured to couple to a BLDC motor and a microcontroller coupled to the interface circuitry. The microcontroller is programmed to: measure BEMF voltages received from the interface circuitry during a start period of the BLDC motor; calculate an average BEMF voltage value from the measured BEMF voltages; calculate an instantaneous BEMF voltage; and compare the average BEMF voltage with the instantaneous BEMF voltage to determine a time of a next commutation cycle for driving the BLDC.

Particular implementations of sensorless BLDC motor control provide one or more of the following advantages: 1) good characteristics at high speed; 2) easy implementation that uses minimum amount of CPU processing capability; 3) requires only 3 pairs of resistors for voltage sensing; and 4) $V_{dc}$ or pseudo-neutral voltage sensing is not required.

The details of one or more disclosed implementations are set forth in the accompanying drawings and the description below. Other features, aspects, and advantages will become apparent from the description, the drawings and the claims.

DETAILED DESCRIPTION

Overview of Sensorless BLDC Motor Control

Figure 5:
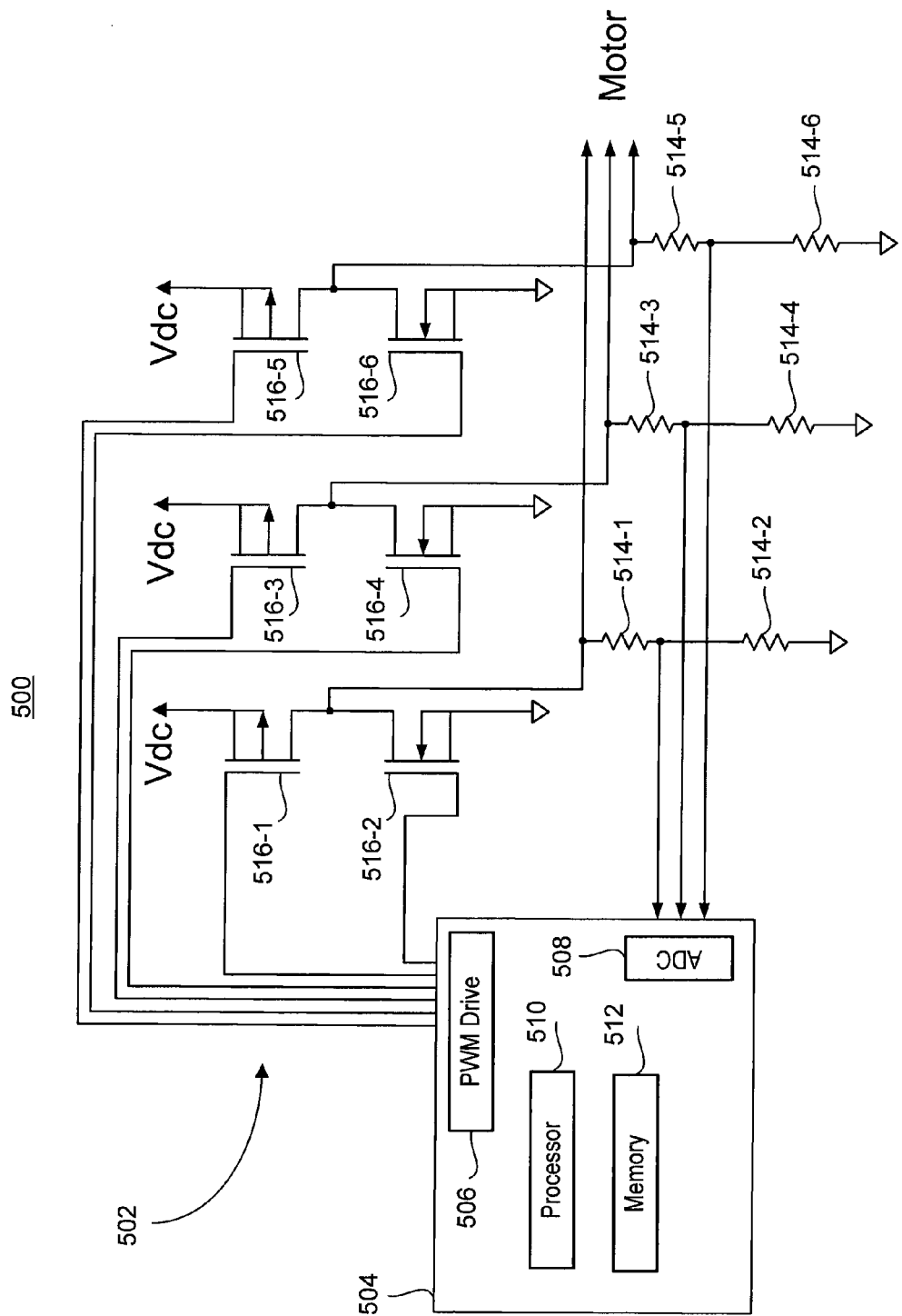
FIG. 5 is a simplified schematic of a hardware implementation of a sensorless BLDC motor control system.

A three-phase connected BLDC motor is normally driven by a three-phase inverter using 6-step commutation, as shown in FIG. 5. To produce maximum torque, the inverter can be commutated every 60 electrical degrees so that current is in phase with the BEMF. The conducting interval for each phase is 120 electrical degrees or 2 steps. The commutation timing is determined by rotor position, which can be determined every 60 electrical degrees by detecting when the BEMF on the floating phase crosses the "zero potential" or "zero crossing" point. As only two phases conduct current at any step, one phase is always available to measure BEMF.

Since BEMF is proportional with motor speed, it can be measured after the motor is running above a minimum speed, such as during an open loop motor start period. A processor averages these BEMF voltages for n degrees (e.g., 60 degrees) of a no-switching interval. This averaging can be repeated for a period of time sufficient for convergence.

If the center of the no-switching interval is $\theta_n$, the average BEMF voltage can be given by $$E_{ave} = \frac{3}{2}Em\frac{3}{\pi}\sin(\theta_n) + \frac{1}{2}Vdc. \quad [1]$$

The average BEMF voltage obtained from equation [1] is compared with an instantaneous BEMF voltage at a terminal, which is given by $$E(\theta_{n+1}) = \frac{3}{2}Em\sin(\theta_{n+1}) + \frac{1}{2}\text{ Vdc}. \quad [2]$$

In some implementations, the comparing of equations [1] and [2] can be done by firmware running in a microcontroller. When $E_{ave}=E(\theta_{n+1})$, a crossover point of BEMF voltage is detected by the processor. Thus, $$E_m\sin(\theta_{n+1}) = E_m\frac{3}{\pi}\sin(\theta_n). \quad [3]$$

As a result, $$\frac{\sin(\theta_{n+1})}{\sin(\theta_n)} = \frac{3}{\pi} < 1. \quad [4]$$

Thus, at steady state $$\lim_{n\to\infty}\sin(\theta_n)=0. \quad [5]$$

Figure 1:
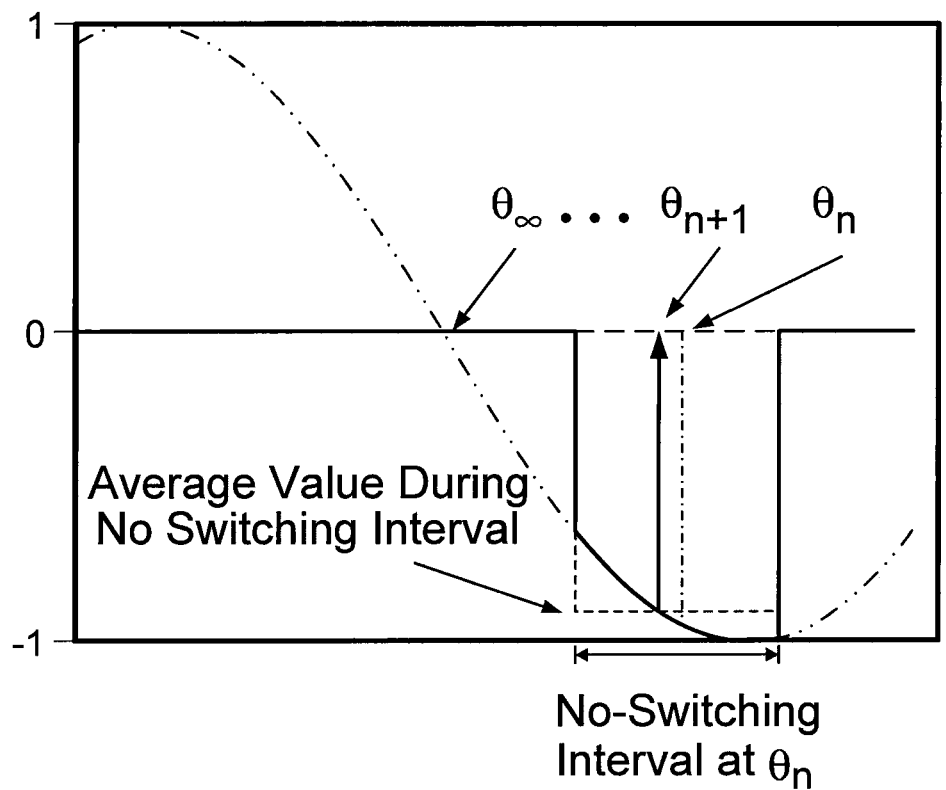
FIG. 1 illustrates a converging process of a no-switching interval.

According to equations [3]-[5], the no-switching interval will happen exactly around the zero crossing point of the BEMF voltage. FIG. 1 illustrates a converging process of the no-switching interval from motor start-up to steady state. As the motor moves towards steady state, $\theta_n$ converges to zero (a zero crossing point).

Figure 2:
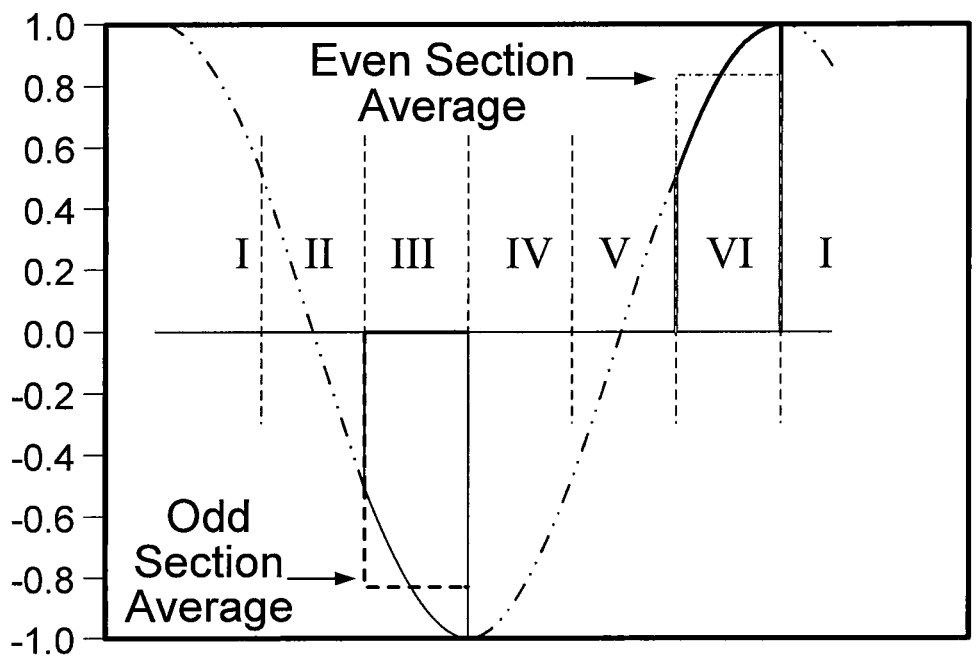
FIG. 2 illustrates an average BEMF voltage difference for even and odd steps of a commutation switching sequence.

FIG. 2 illustrates an average value difference of even and odd steps of a commutation switching sequence. In an actual application, two different averages are calculated based on an order of the commutation switching sequence. As shown in FIG. 2, the odd steps of the commutation switching sequence have an average BEMF voltage that is different from the average BEMF voltage for the even steps of the commutation switching sequence.

Figure 3:
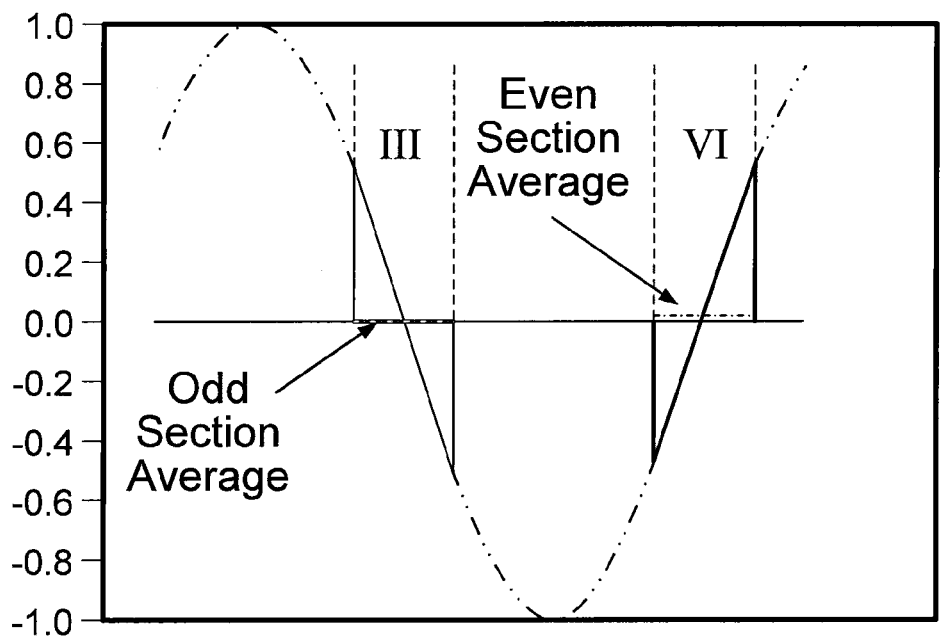
FIG. 3 illustrates average BEMF voltages and no-switching interval at steady state.

FIG. 3 illustrates average BEMF voltages and a no-switching interval at steady state. After converging to steady state, the no-switching interval can be applied around the zero crossing point ($\theta_n=0$).

The method described above relies heavily on the curvature of the sine wave around the zero crossing point. As shown in FIG. 3, the sine wave is almost a straight line around the zero crossing point. Thus, convergence will be slow and sensitive to measurement noise. A reduction factor r can be used to speed-up convergence and reduce sensitivity to measurement noise.

Figure 4:
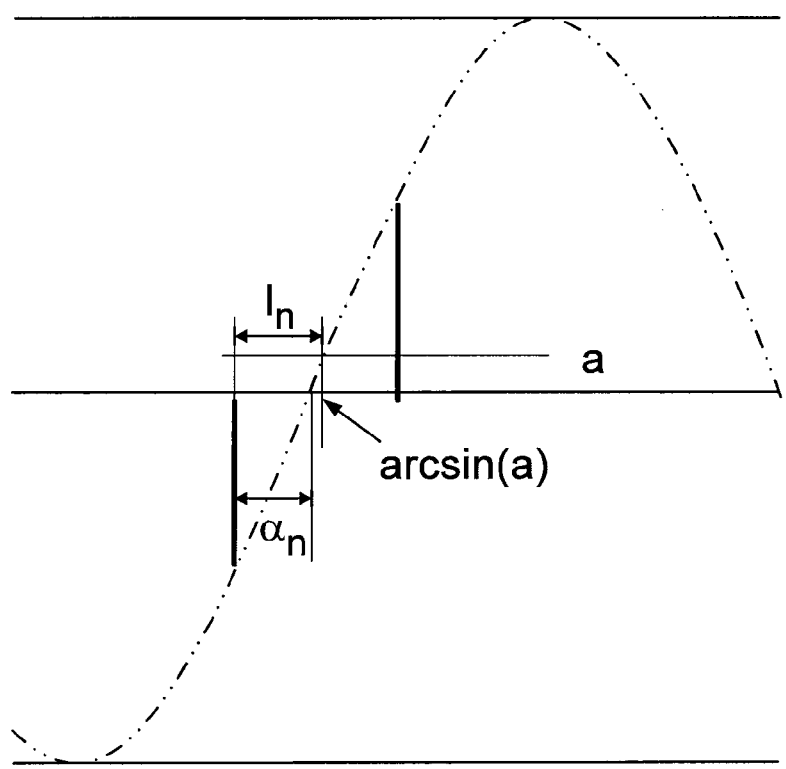
FIG. 4 illustrates a mean value and commutation angle.

FIG. 4 illustrates a mean value and commutation angle. Ideally, a in FIG. 4 should be 30 degrees. With the reduction factor r, the solution is given by $$\alpha_\infty = \frac{\pi}{6r} - \sin^{-1}(a), \quad [6]$$

where $\alpha_\infty$ is the commutation angle at steady state, r is the reduction factor and a is an averaged value. If r=1, in equation [6], $\alpha_n$ will have the discrepancy of $\sin^{-1}(a)$, which is almost the same with a around the zero crossing point. By making r<1, the no-switching interval can be shifted to the left in FIG. 4 to reduce the averaged value a. Thus, $\sin^{-1}(a)$ will go lower at the next commutation cycle. At steady state, there will be an angle discrepancy given by $$\alpha - \frac{\pi}{6} = \frac{\pi}{6}\left[\frac{1-r}{r}\right], \quad [7]$$

This discrepancy will not affect performance because equation [7] is a small value. For example, if r=0.9, a=3.3 degrees.

FIG. 5 is a simplified schematic of a hardware implementation of sensorless BLDC motor control system 500. In some implementations, system 500 includes power inverter 502 and microcontroller 504. Power inverter 502 can include six power transistors 516 (e.g., MOSFET or IGBT devices) having gates coupled to microcontroller 504. The three-phase motor terminals are tapped from drains of transistors 516. Sense resistors 514 sense phase voltages from the three-phase motor terminals and couple those voltages to microcontroller 504.

In some implementations, microcontroller 504 includes PWM drive 506, analog-to-digital converter (ADC) 508, processor 510 and memory 512 (e.g., EEPROM). Other hardware modules can be included, such as a power supply and management module, protection circuit module, motion control feedback module and any other circuitry that is typically used in a sensorless BLDC driver.

Firmware instructions stored in memory 512 can be derived from assembly or a higher-level software language, and can include various software modules, including but not limited to: a speed module, speed controller, current controller, PWM generator and fault monitoring. PWM drive 506 generates switching signals that are applied to gates of transistors 516 to implement a commutation switching sequence using well-known commutation switching techniques. ADC 508 samples BEMF voltages from the motor terminals through sense resistors 514.

During a motor start period, processor 510 runs the firmware stored in memory 512 to calculate odd and even average BEMF voltages based on BEMF voltages sensed from the motor terminals by sense resistors 514. During steady state operation, process 510 compares those average BEMF voltages with instantaneous BEMF voltages sensed from the motor terminals to detect crossover points for the BEMF voltages. Having sensed the crossover points, process 510 predicts the time required for the next commutation cycle using known techniques.

Figure 6:
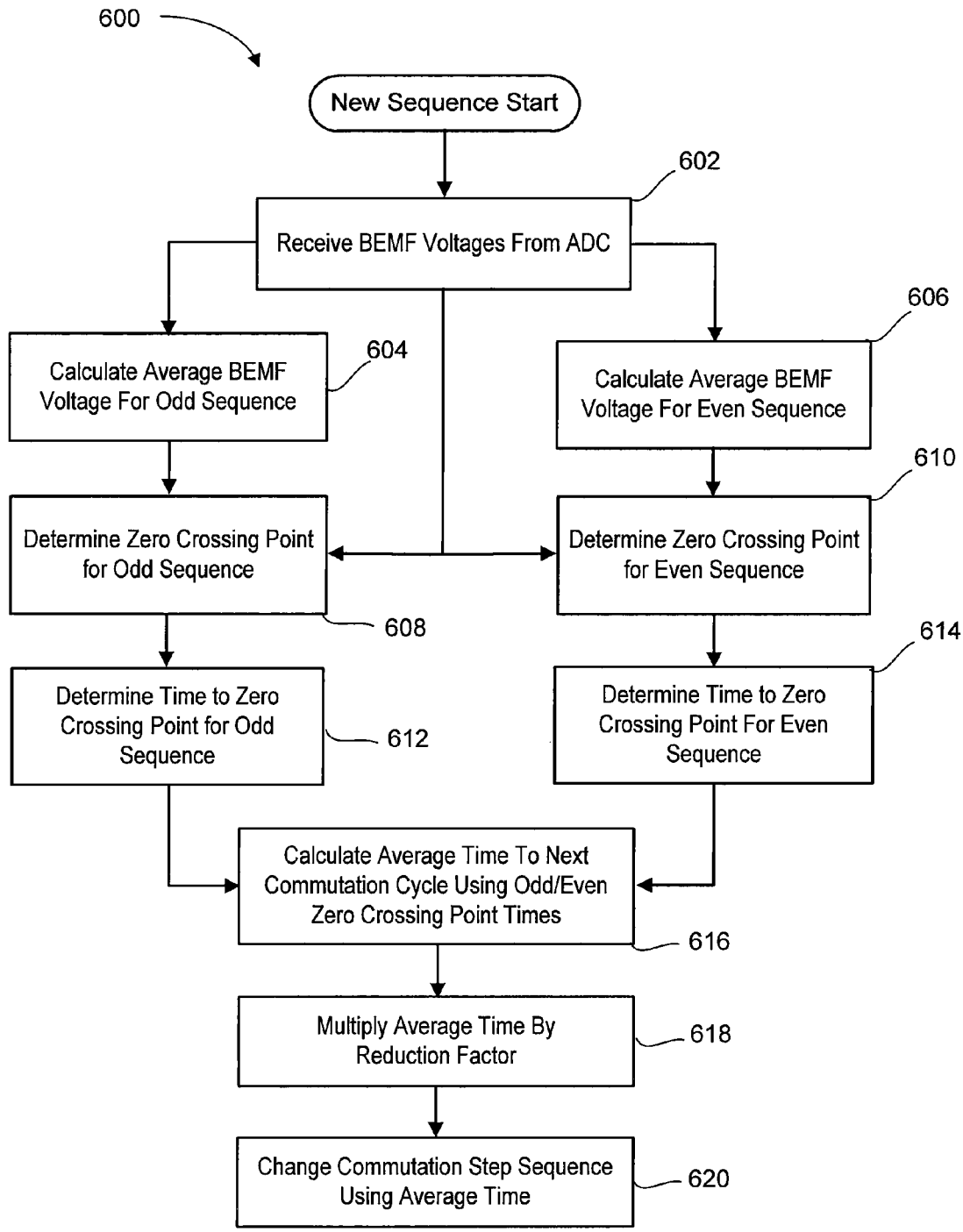
FIG. 6 is a flow diagram of an exemplary process for sensorless BLDC motor control.

FIG. 6 is a flow diagram of an exemplary process 600 for sensorless BLDC motor control. Process 600 can be implemented in firmware stored in memory 512 and executed by processor 510.

In some implementations, process 600 can begin at the start of a new commutation switching sequence. During a motor start period (e.g., open loop), analog BEMF voltages are sensed from motor terminals and converted to digital values by an ADC (602). The average BEMF voltage values are calculated separately by a microcontroller for odd sequence steps (604) and even sequence steps (606) and stored in memory. The average BEMF voltages can be calculated by adding all the BEMF voltage measurements over an update period and dividing by the total number of BEMF voltage measurements.

During steady state operation of the motor, the average values for BEMF voltages for odd and even sequences are compared to instantaneous BEMF voltages for odd and even sequences to detect odd and even crossover points (608, 610). The times to next commutation for odd and even sequences are calculated (612, 614). The commutation times for odd and even sequences are averaged to provide an average time to the next commutation cycle (616). The average time can be computed by adding the odd and even commutation times and dividing by 2. Optionally, the average time can be scaled by a reduction factor (618). For example, equation [7] can be used to determine an appropriate reduction factor (e.g., 0.9375). A change to the commutation switching sequence can be made using a scaled or un-scaled average time to next commutation cycle (618).

Process 600 is further illustrated in the following exemplary pseudo code, which can be implemented by firmware stored in memory 512 and executed by processor 510 of microcontroller 504.

Example Pseudo Code assigns these average values to variables zc_odd and zc_even, respectively. In the example code, the calculations for average BEMF voltages for odd and even sequences can be performed every 250 milliseconds, where 62.5 microseconds or 16 kHz is the PWM switching frequency. This update time, however, is exemplary and thus can be changed as desired.

The next section of code determines if the current time (denoted as the variable "ii") is greater than or equal to a target_duration (target_duration) after zero crossing detection or if the time is greater than 128, where 128 is approximately the minimum speed of the motor (600 rpm). If either of these conditions are true, the commutation sequence (commutationStep) is incremented to the next step in the switching sequence, and the current time and an after zero crossing detection flag (after_zc_detection) are reset to zero. Setting after_zc_detection to zero means processor 510 is waiting for zero crossing detection.

The next section of code performs zero crossing detection for the odd steps of the commutation switching sequence (steps 1, 3, 5). If the commutation step is greater than or equal

```
if( (InterruptClock & 4095) == 4095){ //updates every 62.5x4095 ~=250msec.
        zc_odd=(U16)(vtg_sum_odd32>>11); // average value = sum/2048;
        vtg_sum_odd32=0;
        zc_even=(U16)(vtg_sum_even32>>11); // average value = sum/2048;
        vtg_sum_even32=0;
}
    if( ( (ii >= target_duration) && after_zc_detection ) || (ii>128) ) /* 128~= min speed 600rpm*/ {
        commutationStep++; // if time passes more than target duration, change the commutation sequence
        ii=0;                       // reset time
        after_zc_detection=0; // This means the CPU is waiting for zero crossing
    }
}
if (commutationStep>=6) {
    commutationStep=0;
}
if(commutationStep & 1){
    vtg_sum_odd32 = vtg_sum_odd32 + (U32)NewADC;
    neutral_vtg=zc_odd;
    if(ii>3){
        if ( (NewADC < neutral_vtg) && (!after_zc_detection) ) {
            after_zc_detection=1; // zero crossing(exactly crossover between momentary and average BEMF) occurred.
            target_duration = ((old_duration+ii)*phase_adjust) >>4; // phase adjust is 15 than correction factor is (15)>>4=15/16=0.9375
            old_duration=ii; // this old duration obtained at odd sequence will be used to determine target duration at even sequence
/*target_duration = ( time to zero cross at even sequence + time to zero cross at odd sequence ) /2 * 2 * 0.9375, where "/2" is for averaging of two time. "*2" is needed because commutation time is twice the time to zero crossing */
        }
    }
}
else{
    vtg_sum_even32 = vtg_sum_even32 + (U32)NewADC;
    neutral_vtg=zc_even;
    if(ii>3){
        if ( (NewADC > neutral_vtg) && (!after_zc_detection) ){
            after_zc_detection=1;
            target_duration = ((old_duration+ii)*phase_adjust) >>4;
            old_duration=ii; // this old duration obtained at even sequence will be used to determine target duration at odd sequence
        }
    }
}
while (ADCSRA & (1 << ADSC)){ }
NewADC= ADC;
```

In the example pseudo code above, the first section of code calculates average BEFM voltages for odd and even sequences of the commutation switching sequence, and to six, commutationStep=0. At odd steps of the commutation switching sequence, an instantaneous BEMF voltage (NewADC) is compared against the average BEMF for odd steps. If the instantaneous BEMF voltage is less than the average BEMF voltage for odd steps (indicating a zero crossing), then after_zc_detection is set to 1 and target_duration is calculated from the time to zero crossing of the even sequence (old_duration) plus the time to zero crossing of the odd sequence, which is the current time "ii," multiplied by a reduction factor (phase_adjust). In this example, phase_adjust=15 degrees (half of the desired 30 degrees), so the reduction factor is $(15)>>4=15/2^4=15/16=0.9375$, and old_duration=ii. Note that old_duration obtained for the odd sequence will be used to determine target_duration for the even sequence.

The last section of the code performs zero crossing detection for the even steps of the commutation switching sequence (steps 2, 4, 6) in a manner similar to zero crossing detection for the odd steps. For the even steps, however, a zero crossing occurs when the instantaneous BEMF voltage is greater than the average BEMF voltage for even steps (See FIGS. 2-3). The variable old_duration is set equal to the current time and will be used to determine target_duration for the odd sequence, as previously described.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method of detecting back electromotive force (BEMF) for controlling a brushless DC (BLDC) motor, the method comprising:
   measuring, by a microcontroller coupled to a BLDC motor, BEMF voltages during a start period of the BLDC motor;
   determining, by the microcontroller, an average BEMF voltage value from the measured BEMF voltages by calculating averages based on an order of a commutation switching sequence for driving the BLDC motor, wherein calculating the averages includes:
      calculating a first average value for odd steps of the commutation switching sequence, and
      calculating a second average value for even steps of the commutation switching sequence;
   determining, by the microcontroller, an instantaneous BEMF voltage; and
   comparing, by the microcontroller, the average BEMF voltage with the instantaneous BEMF voltage to detect a crossover time, which converges to zero crossing of the BEMF voltage.

2. The method of claim 1, comprising:
   detecting a crossover based on results of the comparing; and
   determining, in response to the crossover detection, a time to a next commutation cycle for driving the BLDC motor.

3. The method of claim 2, where determining a time to a next commutation cycle, comprises:
   detecting a first crossover of BEMF voltage for odd steps of the commutation switching sequence;
   calculating a first time to commutation based on the first crossover detection;
   detecting a second crossover of BEMF voltage for even steps of the commutation switching sequence;
   calculating a second time to zero crossing based on the second crossover detection;
   calculating an average time to a next commutation cycle by averaging the odd and even crossover times; and
   changing the commutation switching sequence using the average time to a next commutation cycle.

4. The method of claim 3, comprising:
   multiplying the average time to a next commutation cycle by a reduction factor.

5. A system comprising:
   interface circuitry configured to couple to a brushless DC (BLDC) motor; and
   instructions stored in memory that, when executed by a processor coupled to the interface circuitry, configured to cause the processor to:
      measure back electromotive force (BEMF) voltages received from the interface circuitry during a start period of the BLDC motor;
      calculate an average BEMF voltage value from the measured BEMF voltages by calculating averages based on an order of a commutation switching sequence for driving the BLDC motor, wherein calculating the averages includes:
         calculating a first average value for odd steps of the commutation switching sequence, and
         calculating a second average value for even steps of the commutation switching sequence;
      calculate an instantaneous BEMF voltage; and
      compare the average BEMF voltage with the instantaneous BEMF voltage to detect a crossover time, which converges to zero crossing of the BEMF voltage.

6. The system of claim 5, where the instructions are configured to cause the processor to:
   detect a crossover based on results of the comparing; and
   determine, in response to the crossover detection, a time for a next commutation cycle for driving the BLDC motor.

7. The system of claim 6, where determining a time to a next commutation cycle, comprises:
   detecting a first crossover point of BEMF voltage for odd steps of the commutation switching sequence;
   calculating a first time to commutation based on the first crossover point detection;
   detecting a second crossover point of BEMF voltage for even steps of the commutation switching sequence;
   calculating a second time to commutation based on the second crossover point detection;
   calculating an average time to a next commutation cycle by averaging the odd and even times to commutation; and
   changing the commutation switching sequence using the average time to a next commutation cycle.

8. The system of claim 7, where the instructions are configured to cause the processor to:
   multiply the average time to a next commutation cycle by a reduction factor.

9. The system of claim 5, wherein the BLDC motor includes a three-phase connected BLDC motor, and wherein two phases of the BLDC motor are operable to conduct current at a time, while a third phase of the BLDC motor is operable to measure BEMF voltages.

10. The system of claim 9, wherein the BLDC motor includes a power inverter and a microcontroller.

11. The system of claim 10, wherein the power inverter includes power transistors having gates coupled to the microcontroller.

12. The system of claim 11, wherein the microcontroller includes a pulse width modulation (PWM) drive that is operable to generate switching signals applied to the gates of the power transistors to implement the commutation switching sequence.

13. The system of claim 10, wherein the BLDC motor includes sense resistors that are operable to sense phase voltages from motor terminals and couple the sensed phase voltages to the microcontroller.

14. The system of claim 13, wherein the microcontroller includes an analog-to-digital converter (ADC) that is operable to sample BEMF voltages from the motor terminals through the sense resistors.

15. A computer-program product including instructions stored in a non-transitory memory that, when executed by a processor, are configured to cause the processor to perform operations as described in claim 5.

16. The computer-program product of claim 15, where the instructions are configured to cause the processor to perform operations comprising:
   detecting a crossover based on results of the comparing; and
   determining, in response to the crossover detection, a time for a next commutation cycle for driving the BLDC motor.

17. The computer-program product of claim 16, where determining a time to a next commutation cycle comprises:
   detecting a first crossover point of BEMF voltage for odd steps of the commutation switching sequence;
   calculating a first time to commutation based on the first crossover point detection;
   detecting a second crossover point of BEMF voltage for even steps of the commutation switching sequence;
   calculating a second time to commutation based on the second crossover point detection;
   calculating an average time to a next commutation cycle by averaging the odd and even times to commutation; and
   changing the commutation switching sequence using the average time to a next commutation cycle.

18. The computer-program product of claim 17, where the instructions are configured to cause the processor to perform operations comprising:
   multiplying the average time to a next commutation cycle by a reduction factor.

19. The computer-program product of claim 15, wherein the BLDC motor includes a power inverter and a microcontroller, wherein the power inverter comprises power transistors having gates coupled to the microcontroller and the microcontroller comprises a pulse width modulation (PWM) drive that is operable to generate switching signals applied to the gates of the power transistors to implement the commutation switching sequence.

20. The computer-program product of claim 19, wherein the BLDC motor includes sense resistors that are operable to sense phase voltages from motor terminals and couple the sensed phase voltages to the microcontroller, and wherein the microcontroller includes an analog-to-digital converter (ADC) that is operable to sample BEMF voltages from the motor terminals through the sense resistors.

* * * * *